United States Patent
Okazaki et al.

(10) Patent No.: US 9,356,644 B2
(45) Date of Patent: May 31, 2016

(54) WIRELESS CIRCUIT AND FREQUENCY PAIR DETERMINATION METHOD

(71) Applicant: NTT DOCOMO, INC., Tokyo (JP)

(72) Inventors: Hiroshi Okazaki, Tokyo (JP); Kunihiro Kawai, Tokyo (JP); Shoichi Narahashi, Tokyo (JP); Yuta Takagi, Tokyo (JP); Takayuki Furuta, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 72 days.

(21) Appl. No.: 14/363,087

(22) PCT Filed: Jul. 10, 2013

(86) PCT No.: PCT/JP2013/068828
§ 371 (c)(1),
(2) Date: Jun. 5, 2014

(87) PCT Pub. No.: WO2014/013915
PCT Pub. Date: Jan. 23, 2014

(65) Prior Publication Data
US 2014/0349592 A1 Nov. 27, 2014

(30) Foreign Application Priority Data
Jul. 17, 2012 (JP) .................................. 2012-158549

(51) Int. Cl.
*H04B 1/50* (2006.01)
*H04B 1/00* (2006.01)

(52) U.S. Cl.
CPC ................ *H04B 1/50* (2013.01); *H04B 1/0057* (2013.01)

(58) Field of Classification Search
USPC ...................... 455/75, 522, 509, 552.1, 41.13; 340/572.1
See application file for complete search history.

(56) References Cited

U.S. PATENT DOCUMENTS

2005/0221855 A1* 10/2005 Kuriyama ............ H04B 1/0483
455/553.1
2005/0245202 A1* 11/2005 Ranta ........................ H04B 1/48
455/78

(Continued)

FOREIGN PATENT DOCUMENTS

EP 1 641 308 A1 3/2006
EP 1 755 230 A2 2/2007

(Continued)

OTHER PUBLICATIONS

Office Action issued Sep. 2, 2014 in Japanese Patent Application No. 2012-158549 (with English translation).

(Continued)

*Primary Examiner* — Nay A Maung
*Assistant Examiner* — Erica Fleming-Hall
(74) *Attorney, Agent, or Firm* — Oblon, McClelland, Maier & Neustadt, L.L.P.

(57) ABSTRACT

A wireless circuit that can be used in a plurality of frequency bands even if its duplexer is formed of current variable frequency filters is provided. The circuit includes a transmission-reception antenna 911, a variable frequency duplexer 131, a double-pole six-throw switch 923, an RFIC 180, and a controller 190 which executes switching operations in accordance with control signals. The RFIC 180 determines a pair of frequency bands for transmission and reception signals input to the variable frequency duplexer 131 and generates and sends the control signals to perform switching control operations to connect a transmission port corresponding to the determined transmission frequency band with the transmission terminal of the variable frequency duplexer 131 and to connect a reception port corresponding to the determined reception frequency band with the reception terminal of the variable frequency duplexer 131 and to perform a frequency switching operation of the variable frequency duplexer 131.

6 Claims, 13 Drawing Sheets

(56) References Cited

U.S. PATENT DOCUMENTS

| | | | | |
|---|---|---|---|---|
| 2006/0063543 | A1* | 3/2006 | Matoba | H04L 1/0003 455/509 |
| 2007/0042802 | A1* | 2/2007 | Park | H04B 1/006 455/552.1 |
| 2007/0075803 | A1* | 4/2007 | Kemmochi | H04B 1/0057 333/132 |
| 2007/0171997 | A1* | 7/2007 | Weissman | H03F 1/0205 375/297 |
| 2007/0190954 | A1* | 8/2007 | Murakami | H03H 7/38 455/132 |
| 2008/0205509 | A1* | 8/2008 | Le Naour | H04B 1/0057 375/240.01 |
| 2008/0212552 | A1* | 9/2008 | Fukamachi | H04B 1/0057 370/343 |
| 2009/0128254 | A1* | 5/2009 | Goi | H03H 7/465 333/101 |
| 2010/0135226 | A1* | 6/2010 | Chandramouli | H04W 36/02 370/329 |
| 2010/0260082 | A1* | 10/2010 | Lum | H04B 1/48 370/297 |
| 2012/0093044 | A1* | 4/2012 | Ishida | H04B 1/0067 370/280 |
| 2013/0309985 | A1* | 11/2013 | Saito | H04B 1/006 455/114.3 |
| 2014/0038663 | A1* | 2/2014 | George | H04B 1/006 455/550.1 |
| 2014/0321312 | A1* | 10/2014 | Narahashi | H04B 1/525 370/252 |

FOREIGN PATENT DOCUMENTS

| | | |
|---|---|---|
| JP | 2003 78436 | 3/2003 |
| JP | 2011 182271 | 9/2011 |

OTHER PUBLICATIONS

International Search Report Issued Sep. 3, 2013 in PCT/JP13/068828 Filed Jul. 10, 2013.

Extended European Search Report issued Jun. 1, 2015 in Patent Application No. 13819933.6.

* cited by examiner

WIRELESS CIRCUIT AND FREQUENCY PAIR DETERMINATION METHOD

TECHNICAL FIELD

The present invention relates to a wireless circuit to be used in portable terminals and to a frequency pair determination method for determining a pair of frequency bands for transmission and reception signals to be input to a duplexer in a wireless circuit used in portable terminals.

BACKGROUND ART

Recently, LTE-Advanced has been standardized as an advanced variation of LTE (Long_Term_Evolution), which was standardized in 3GPP Releases 8 and 9. The LTE-Advanced specifications include a carrier aggregation technique. Carrier aggregation is a technique of using aggregated carrier waves of blocked bands each having, for example, a bandwidth of 20 MHz for simultaneous transmission and reception, and each carrier wave is called a component carrier. There are two types of carrier aggregation: Intra-band carrier aggregation uses aggregated component carriers in the same frequency band for transmission and reception; and inter-band carrier aggregation uses aggregated component carriers of different frequency bands for transmission and reception. Two formats of inter-band carrier aggregation are inter-band contiguous carrier aggregation, which selects the component carriers from contiguous frequency bands, and inter-band non-contiguous carrier aggregation, which selects the component carriers from non-contiguous frequency bands.

FIG. 1 is a block diagram showing the configuration of a conventional wireless circuit 900 that enables transmission and reception across multiple bands (three frequency bands). As shown in FIG. 1, the wireless circuit 900 includes a transmission-reception antenna 911; a reception antenna 912; a single-pole three-throw switch 921 having a common contact connected to the transmission-reception antenna 911; a single-pole three-throw switch 922 having a common contact connected to the reception antenna 912; duplexers 931, 932, and 933 which have respective common contacts connected to transfer contacts of the switch 921 and receive transmission and reception signals in first, second, and third frequency bands, respectively; band-pass filters 941, 942, and 943 which are connected respectively to transfer contacts of the switch 922 and receive reception signals in the first, second and third frequency bands; amplifiers 951, 952, and 953 which are connected to transmission terminals of the duplexers 931, 932, and 933 and amplify the transmission signals in the first, second, and third frequency bands; low-noise amplifiers 961, 962, and 963 which are connected to reception terminals of the duplexers 931, 932, and 933 and amplify the reception signals in the first, second, and third frequency bands; low-noise amplifiers 964, 965, and 966 which are connected to output terminals of the band-pass filters 941, 942, and 943 and amplify the reception signals in the first, second, and third frequency bands; band-pass filters 971, 972, 973, 974, 975, and 976 which are connected to output terminals of the low-noise amplifiers 961, 962, 963, 964, 965, and 966, respectively, and filter the reception signals; and an RFIC 980 which has transmission ports Tx1, Tx2, and Tx3 for the first, second, and third frequency bands, first reception ports (1)Rx1, (1)Rx2, and (1)Rx3 for the first, second, and third frequency bands, and second reception ports (2)Rx1, (2)Rx2, and (2)Rx3 for the first, second and third frequency bands. The RFIC here is an integrated circuit that includes most parts of a high-frequency analog transmission and reception circuit and its control circuit, required in portable terminals, except for duplexers, transmission amplifiers, and low-noise amplifiers. Some RFICs include low-noise amplifiers, but the amplifiers are provided outside the RFIC in the present configuration example. As shown in FIG. 1, to send and receive carrier waves in different frequency bands, the numbers of duplexers, amplifiers, and band-pass filters should correspond to the number of frequency bands, making the circuit complex, increasing the circuit footprint, and making it difficult to reduce the size of the portable terminals. The increased circuit footprint also increases the packaging cost.

On the other hand, a wireless communication circuit disclosed in Patent literature 1 simplifies the circuit configuration and reduces the circuit footprint by using a broadband power amplifier that can be utilized for transmission signals in multiple frequency bands. The wireless communication circuit in Patent literature 1 improves the simplicity of the circuit by limiting the transmission outputs of the RFIC to one or two (high-band and low-band outputs) and having the broadband power amplifier and an input-output matching correction circuit.

PRIOR ART LITERATURE

Patent literature 1: Japanese Patent Application Laid Open No. 2011-182271

SUMMARY OF THE INVENTION

Problems to be Solved by the Invention

With the wireless communication circuit in Patent literature 1, the broadband power amplifier used in the multiple frequency bands is expected to simplify the circuit and to reduce the circuit footprint. In the wireless communication circuit in Patent literature 1, however, duplexers or band-pass filters are not shared, and if the number of frequency bands increases, the number of duplexers and band-pass filters will inevitably increase. From that point of view, the wireless communication circuit cannot solve the problem of increasing circuit footprint. When sharing of a duplexer in the wireless communication circuit of Patent literature 1 is considered, one method that could be conceived to share the duplexer is to form the duplexer with variable frequency filters. Since the duplexer is provided to prevent a transmission signal in a band adjacent to the band for a reception signal from entering the reception circuit, the pass characteristics should change sharply at the boundary between the adjacent transmission and reception bands. For example, the reception filter of a duplexer should have a pass loss of about 1.0 dB in the reception band and should also have a pass loss of about 40 dB in a transmission band near the reception band. Frequencies that are used or are planned to be used in current mobile phone services are allocated as defined by the 3GPP organization (3GPP TS 36.101). According to the definition, the reception band and the transmission band are very close each other. In a Band 4 frequency allocation for portable terminals, where the transmission frequency band (uplink band) and the reception frequency band (downlink band) are separated by the largest amount, the upper limit of the transmission frequency band is 1,755 MHz, and the lower limit of the reception frequency band is 2,110 MHz, and the degree of frequency separation expressed in a ratio is only about 18% (=(2,110−1,755)/((1,755+2,110)/2)). The degrees of frequency separation between transmission and reception are up to 8% in the other frequency allocations: A Band 1 frequency allocation, which is widely used worldwide, for example, has a separation of only 6%(=(2,110−1 980)/((1,980+2,110)/2)), and an allocation with a separation of less than 1% exists. The conventional duplexers have steep pass characteristics to cope with those very narrow transmission-reception separations. Unlike the conventional duplexers, however, due to technical limitations of filter design, variable frequency filters cannot achieve steep pass characteristics, in adjacent frequency bands that have a frequency separation degree of about 10% at most, which allow the loss in one frequency band to be low and the loss in the other frequency band to be high. Therefore, it is currently difficult to simply apply variable frequency filters to the duplexer. It is an object of the present invention to provide a wireless circuit that can be used in a plurality of frequency bands even if the duplexer is formed of current variable frequency filters.

Means to Solve the Problems

The wireless circuit of the present invention includes a transmission-reception antenna, a variable frequency duplexer, a switch, an RFIC, and a controller. The variable frequency duplexer has a common terminal connected to the transmission-reception antenna. The switch is a double-pole 2N-throw switch (N is an integer not smaller than 1) and has two common contacts respectively connected to a transmission terminal and a reception terminal of the variable frequency duplexer. The RFIC has N transmission ports and N reception ports, and the transmission ports and reception ports are connected respectively to 2N transfer contacts of the switch. The controller is connected to the variable frequency duplexer and the switch through control lines and executes switching control operations of the switch and a frequency switching operation of the variable frequency duplexer in accordance with control signals.

The RFIC determines a pair of frequency bands for a transmission signal and a reception signal input to the variable frequency duplexer and generates and sends the control signals for performing the switching control operations to connect a transmission port corresponding to the determined transmission-signal frequency band with the transmission terminal of the variable frequency duplexer and to connect a reception port corresponding to the determined reception-signal frequency band with the reception terminal of the variable frequency duplexer and for performing the frequency switching operation of the variable frequency duplexer.

Effects of the Invention

According to the wireless circuit of the present invention, the duplexer can be used in a plurality of frequency bands even if the duplexer is formed of current variable frequency filters.

DETAILED DESCRIPTION OF THE EMBODIMENTS

Figure 1:
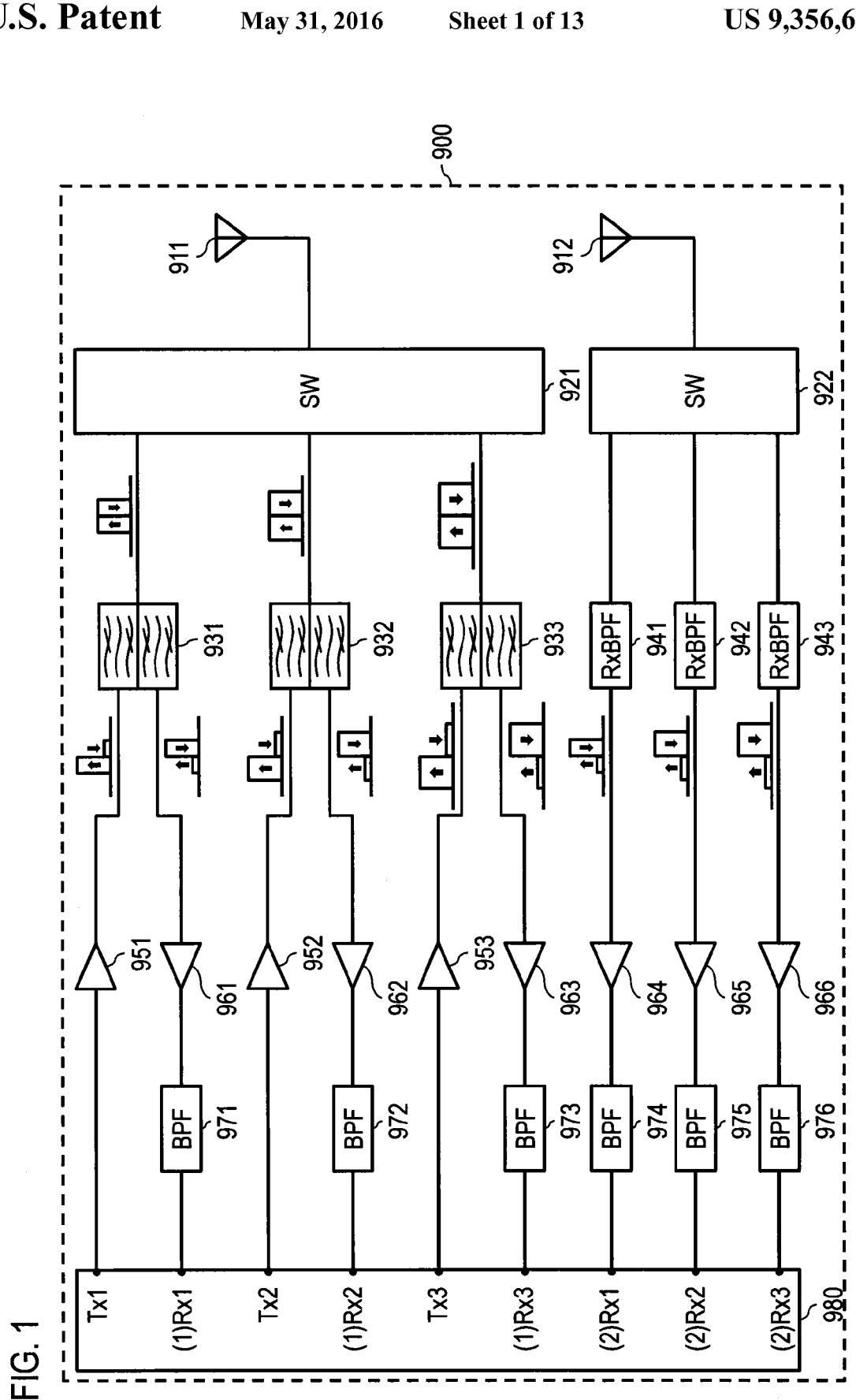
FIG. 1 is a block diagram showing the configuration of a conventional wireless circuit that allows multiband transmission and reception (in three frequency bands)

An embodiment of the present invention will be described below in detail. Components having the same functions will be denoted by identical reference numerals, and overlapped descriptions will be omitted.

Outline of the Present Invention

In the present invention, attention is paid to the carrier aggregation technique adopted in LTE-Advanced in order to use current variable frequency filters in a duplexer. As described earlier, carrier aggregation is a technique of using aggregated component carriers for simultaneous transmission and reception. For example, when one frequency band is used for transmission and two frequency bands are used for reception in inter-band non-contiguous carrier aggregation, which has been described earlier, it is presumed that a single frequency band (3GPP Band 1: 2-GHz band, for example) is used as a pair of frequency bands for transmission and reception, and a component carrier in a frequency band (3GPP Band 19: 800-MHz band, for example) differing from the frequency band used for transmission is used for reception of another wave. Since a duplexer using variable frequency filters is used in the present invention, the component carrier in the frequency band (Band 1, for example) presumed to be used as the pair of frequency bands for transmission and reception will not be received during transmission at least. To use the duplexer formed of current variable frequency filters and to share the duplexer, the wireless circuit in the present invention includes an RFIC different from the conventional RFICs, and a controller. The RFIC included in the wireless circuit of the present invention determines a pair of frequency bands for a transmission signal and a reception signal that can be input to the duplexer utilizing variable frequency filters and outputs control signals for performing switching control operations and a filter characteristics switching operation to the controller. The controller included in the wireless circuit of the present invention executes the switching control operations and the filter characteristics switching operation in accordance with the control signals received from the RFIC. In the present invention, since the RFIC determines the pair of frequency bands for a transmission signal and a reception signal to be input to the duplexer and sends the control signals, and the controller executes the switching operations in accordance with the control signals, the duplexer can be used in multiple frequency bands in a communication environment where carrier aggregation is allowed.

Frequency Band Separation Coefficient

The concept of a frequency band separation coefficient will be used below. The frequency band separation coefficient is a coefficient expressing the degree of separation between the stop band and the pass band. The frequency band separation coefficient can also be used as a coefficient expressing the degree of separation between the frequency bands for a transmission signal and a reception signal. It is defined here that a frequency region having a stop band loss of 40 dB or more is a stop band and that a frequency on the boundary of the stop band near the pass band is frequency α. It is also defined that a frequency region having a pass band loss of 1 dB or less is a pass band and that a frequency on the boundary of the pass band near the stop band is frequency β. While the loss of the stop band is less than 40 dB, it is assumed in calculation that the filters are connected in series. If the stop band is defined as a band having a stop band loss of 20 dB, a frequency region having a pass band loss of 0.5 dB or less is defined as a pass band. The frequency band separation coefficient θ that expresses the degree of separation between the frequency bands of the stop band and the pass band is defined as given below.

Formula 1

$$\theta = \frac{2|\alpha - \beta|}{\alpha + \beta} \times 100 \quad (1)$$

Variable Frequency Filter

Figure 2:
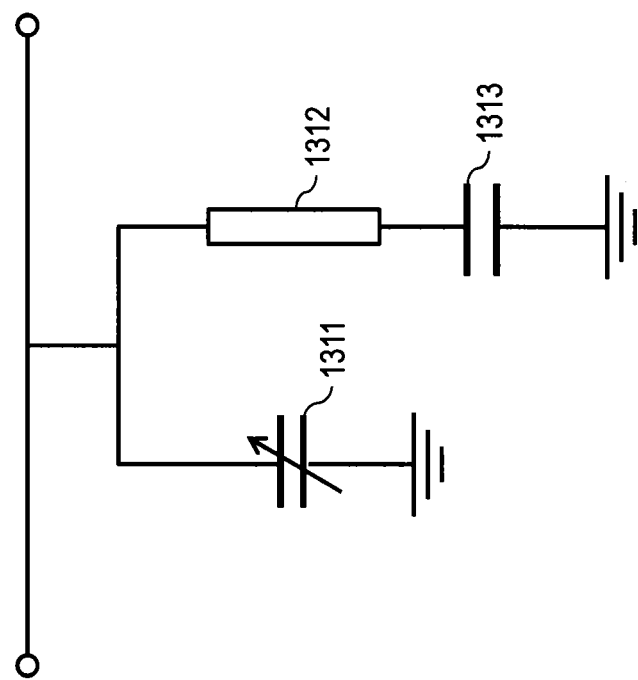
FIG. 2 is a diagram showing an example configuration of a variable frequency filter used as a reception or transmission filter of a duplexer in a wireless circuit of the present invention.
Figure 3:
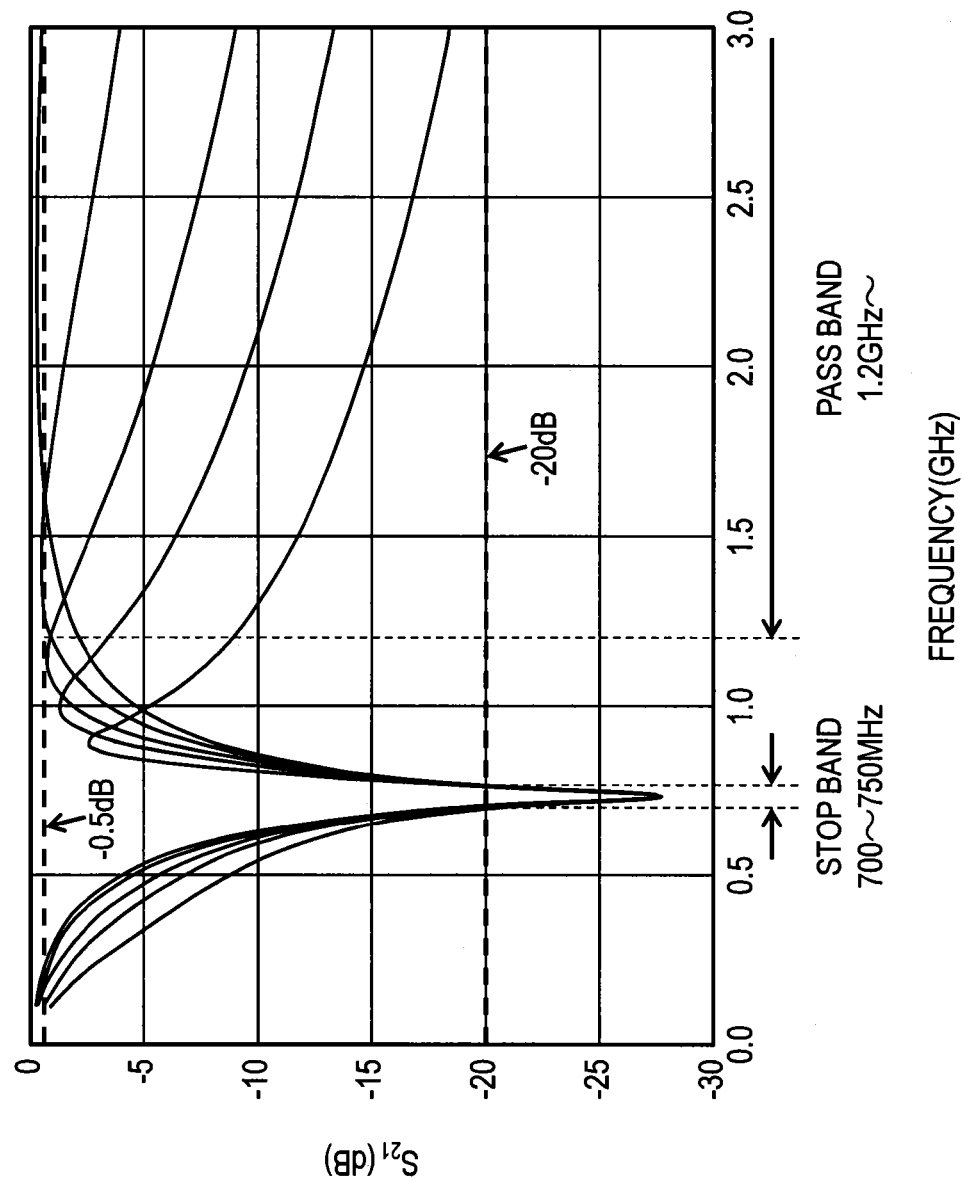
FIG. 3 is a graph showing example pass characteristics of the variable frequency filter shown in FIG. 2.
Figure 4:
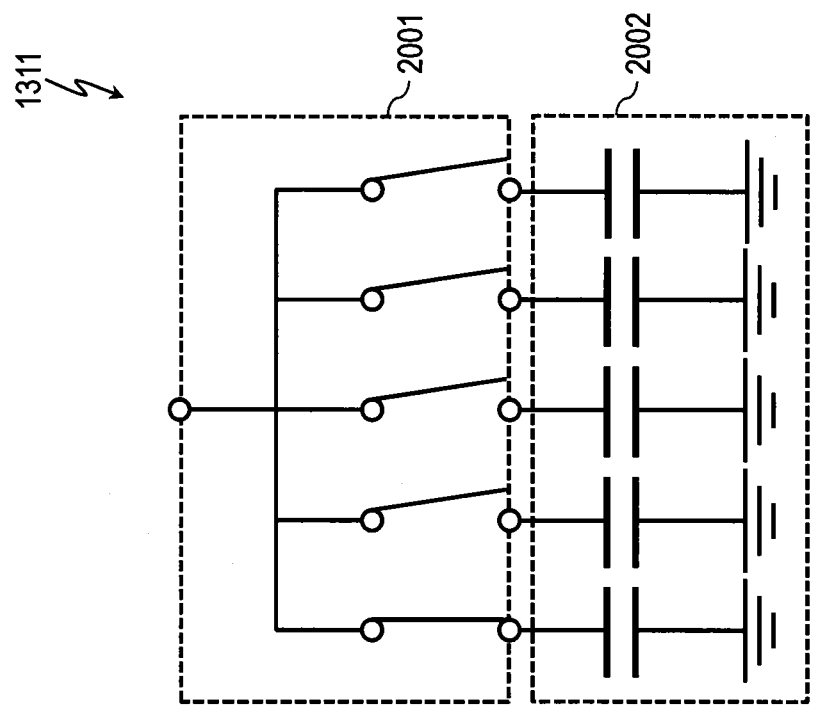
FIG. 4 is a diagram showing an example configuration of a variable capacitor used in the variable frequency filter shown in FIG. 2.

An example configuration and pass characteristics of a variable frequency filter used in the duplexer of the wireless circuit in the present invention will be described below with reference to FIGS. 2, 3, 4, and 5. FIG. 2 is a diagram showing an example configuration of the variable frequency filter used as the reception or transmission filter of the duplexer in the wireless circuit of the present invention. FIG. 3 is a graph showing pass characteristics of the variable frequency filter shown in FIG. 2. FIG. 4 is a diagram showing an example configuration of a variable capacitor used in the variable frequency filter shown in FIG. 2.

Figure 5:
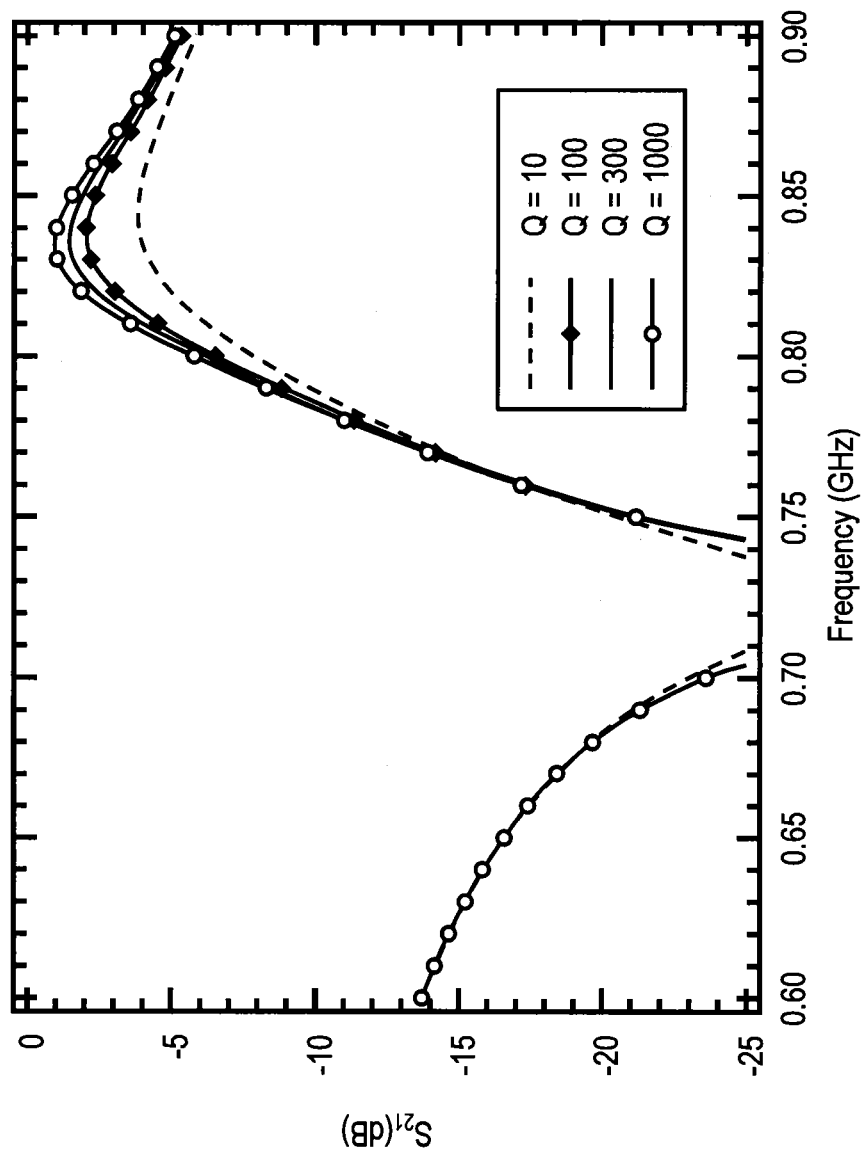
FIG. 5 is a graph showing the effect of Q values on the pass characteristics of the variable frequency filter shown in FIG. 2.

As shown in FIG. 2, the variable frequency filter used in the duplexer of the wireless circuit in the present invention can be formed of a variable capacitance capacitor 1311, a transmission line 1312, and a capacitor 1313. The variable capacitance capacitor 1311 is electrically connected in parallel with a series circuit formed of the transmission line 1312 and the capacitor 1313. The variable capacitance capacitor 1311 and the capacitor 1313 are grounded, each at one end thereof, as shown in FIG. 2. FIG. 2 shows an example of the variable frequency filter that can be used in the present invention; the variable frequency filter used in the present invention is not limited to the configuration shown in FIG. 2. The variable capacitance capacitor 1311 provides a variable capacitance range of 1 to 15 pF. The variable capacitance capacitor 1311 has a Q (quality factor) value of 300 and a series resistance R of 0.2Ω. The transmission line 1312 is a coil for simplicity and has an inductance of 6 nH and a Q value of 30. The capacitor 1313 has a capacitance of 8 pF and a Q value of 300. The Q values of the coil and capacitor are assumed with reference to the Q values of currently available chip inductors and chip capacitors at around 1 GHz. Although a capacitor using a PIN diode has a series resistance component of several ohms, the variable capacitance capacitor 1311 can achieve a series resistance of 0.2Ω and a Q value of 300 in the structure having a low-loss switch 2001 and a capacitor group 2002, as shown in FIG. 4. FIG. 3 is a graph showing the pass characteristics of the variable frequency filter designed under the conditions described above. The vertical axis of the graph represents the S parameter ($S_{21}$) [dB], and the horizontal axis of the graph represents the frequency [GHz]. In view of the fact that the duplexer is currently required to have a pass band loss of about 1 dB and a stop band loss of about 40 dB, two variable frequency filters designed as shown in FIG. 2 and connected in series can be used as a reception or transmission filter having a stop band of 700 to 750 MHz and a pass band of 1.2 GHz or higher. FIG. 5 is a graph showing the effect of the Q values of the components of the filter on the pass characteristics of the variable frequency filter designed as shown in FIG. 2. It is assumed here in calculation that the stop band where a 20 dB suppression is possible ranges from 700 to 750 MHz and that the band where the pass loss is minimized ranges from about 820 to 860 MHz, and, the Q value settings of the components are varied in a range of 10 to 1000 although the lower limit of the Q value of the capacitor is set to 300. As shown in the figure, if the Q value of each component is improved, in particular, even if the Q value of the coil is improved to 1000, more than ten times the current value, the pass band loss of the two filters connected in series to provide a 40 dB suppression in the stop band is as large as 2 dB or so. This indicates that it is difficult to use the variable filters in the duplexer if the frequency band separation coefficient θ is lower than 10.

Figure 6:
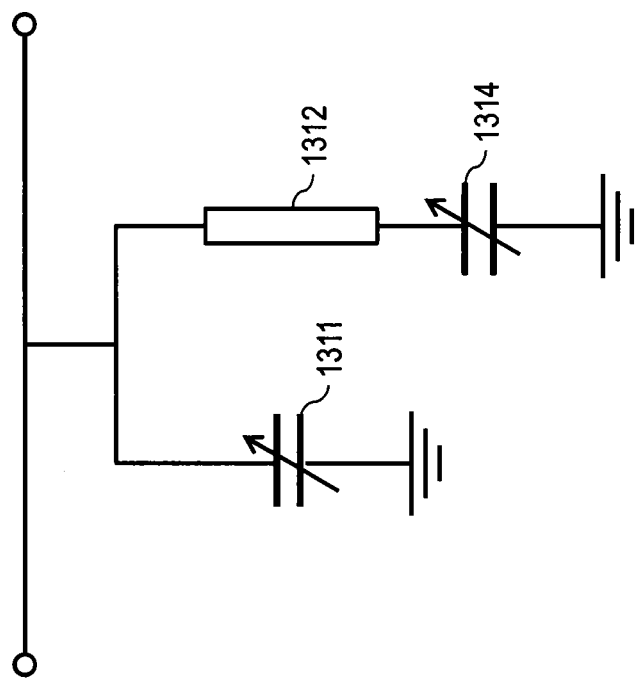
FIG. 6 is a diagram showing an example configuration of a variable frequency filter used as a reception or transmission filter of the duplexer in the wireless circuit of the present invention, the configuration differing from the one shown in FIG. 2.
Figure 7:
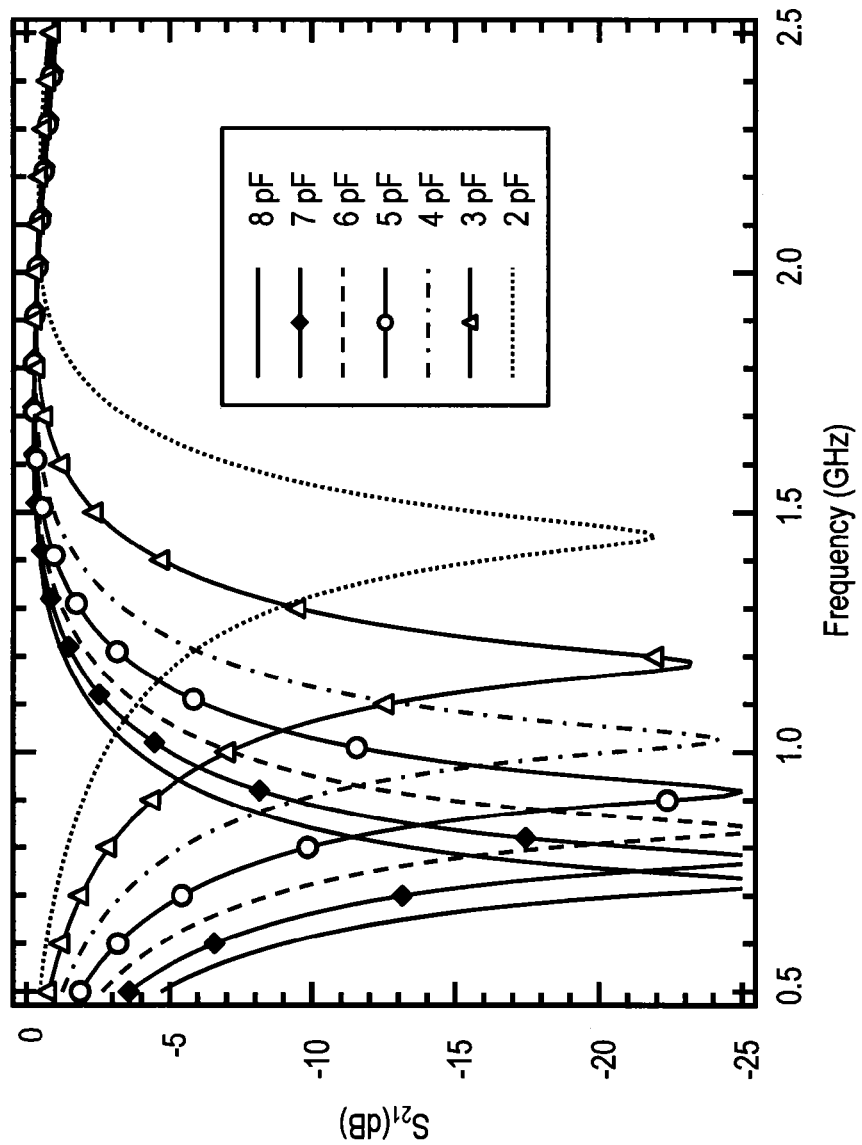
FIG. 7 is a graph showing example pass characteristics of the variable frequency filter shown in FIG. 6.
Figure 8:
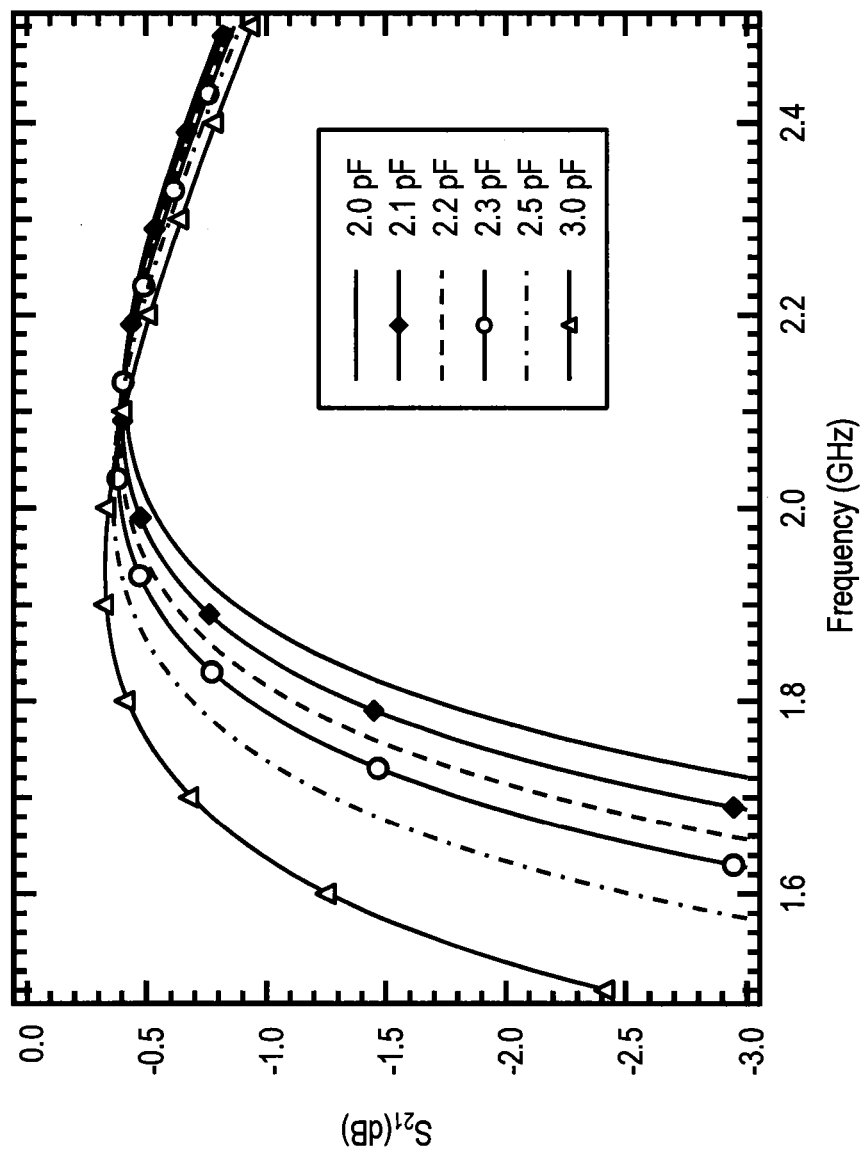
FIG. 8 is an enlarged view of the pass bands in the example pass characteristics of the variable frequency filter shown in FIG. 6.

FIG. 6 is a diagram showing another configuration of a variable frequency filter used as the reception or transmission filter of the duplexer in the wireless circuit of the present invention. FIGS. 7 and 8 are graphs showing examples of pass characteristics of the variable frequency filter shown in FIG. 6.

As shown in FIG. 6, the variable frequency filter used in the duplexer in the wireless circuit of the present invention can be formed of a variable capacitance capacitor 1311, a transmission line 1312, and a variable capacitance capacitor 1314. The variable capacitance capacitor 1311 is electrically connected in parallel with a series circuit formed of the transmission line 1312 and the variable capacitance capacitor 1314. The variable capacitance capacitors 1311 and 1314 are grounded, each at one end thereof, as shown in FIG. 6. The variable capacitance capacitors 1311 and 1314 have a Q value of 300 and a series resistance R of 0.2Ω. The transmission line 1312 is a coil for simplicity and has an inductance of 6 nH and a Q value of 30. FIG. 7 is a graph showing pass characteristics of the variable frequency filter designed by setting the capacitance of the variable capacitance capacitor 1311 to a constant 2 pF and setting the capacitance of the variable capacitance capacitor 1314 in a range of 2 to 8 pF. The vertical axis of the graph represents the S parameter ($S_{21}$) [dB], and the horizontal axis of the graph represents the frequency [GHz]. The graph shows that the pass band with a loss of 0.5 dB or less is near the frequency of 2 GHz, the frequency of the stop band with a loss of 20 dB or more is varied, and as the stop band is brought closer to the pass band, the amount of suppression decreases. When the capacitance of the variable capacitance capacitor 1314 is 2 pF, the pass band with a loss of 0.5 dB or less ranges from 2.02 to 2.26 GHz, the stop band with a loss of 20 dB or more ranges from 1.43 to 1.47 GHz, and the corresponding frequency band separation coefficient θ, which was described earlier, is 31.5. FIG. 8 is a graph showing an enlarged view of the pass characteristics in the pass band of the variable frequency filter designed under the same conditions as in FIG. 7 with the capacitance of the variable capacitance capacitor 1314 set to a value of 2 to 3 pF. As the capacitance value of the variable capacitance capacitor 1314 decreases to bring the stop band closer to the pass band, the pass band shows an increasing minimum loss value and moves to a higher frequency. The configured filter can work while the frequency separation coefficient θ is up to around 30, even if the capacitance value of the variable capacitance capacitor 1314 is lower than 2 pF.

Figure 9:
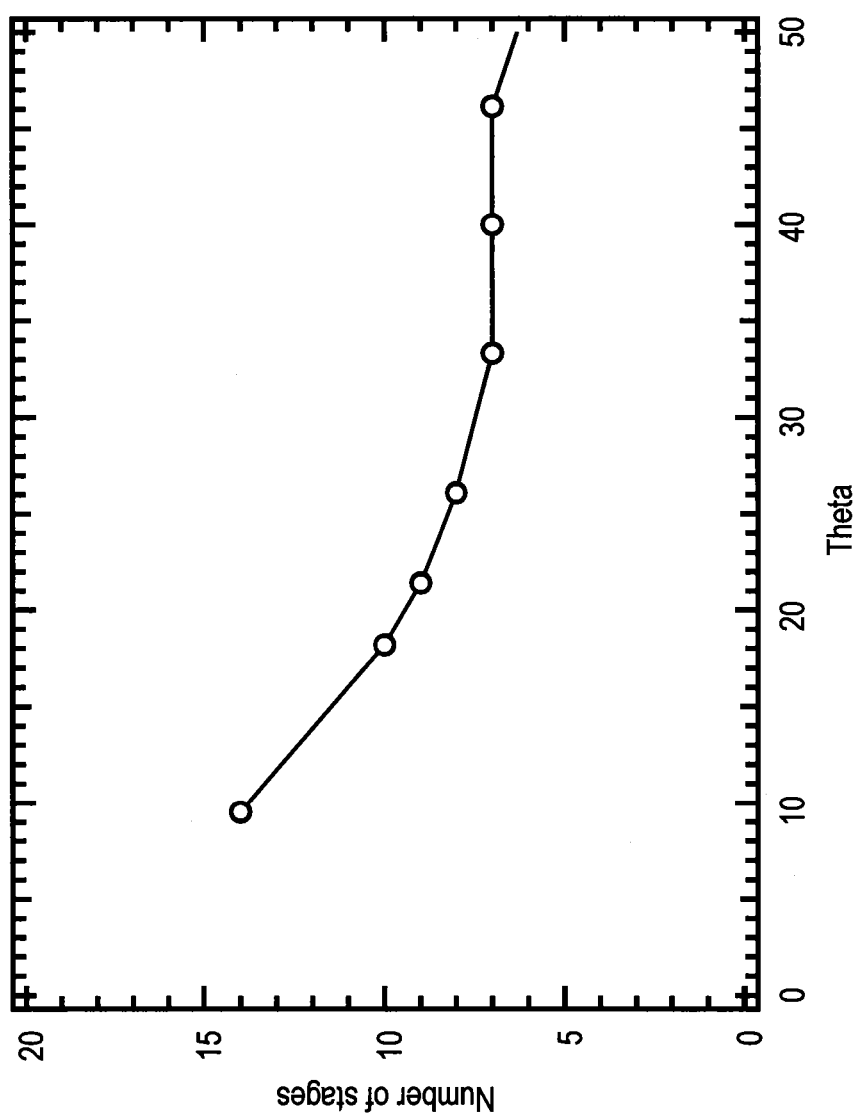
FIG. 9 is a graph showing the number of stages needed to configure a Chebyshev low-pass filter.

FIG. 9 is a graph showing the number of necessary stages with respect to the frequency band separation coefficient θ (theta in FIG. 9), if a Chebyshev low-pass filter is designed under the conditions of a ripple of 1 dB or less in the pass band and an attenuation of 40 dB or more in the stop band. In the calculation, for simplicity, the Q values of the components are assumed to be infinite. Even if those ideal components are used, the number of necessary stages increases when the frequency band separation coefficient θ is small. The Chebyshev low-pass filter includes a coil and a capacitor. If a variable inductance coil and a variable capacitance capacitor are used, a variable frequency filter can be formed. If the Q values of those components are considered, since an increased number of stages worsens the filter characteristics, especially the pass-band loss, the number of stages should be decreased as far as possible. The example shown in FIG. 9 indicates that the number of necessary stages increases sharply when the frequency band separation coefficient θ falls below 30.

A method of determining a pair of frequency bands for a transmission signal and a reception signal will be defined next, while giving consideration to the fact that the performance of current variable frequency filters worsens significantly when the frequency band separation coefficient θ falls below 30, as shown in the design example given above. When the boundary frequency in the transmission frequency band closer to the reception frequency band is $\alpha_1$ and the boundary frequency in the reception frequency band closer to the transmission frequency band is $\beta_1$, the frequency band separation coefficient between the transmission frequency band and the reception frequency band can be defined as shown below, in the same way as in formula 1

Formula 2

$$\theta_1 = \frac{2|\alpha_1 - \beta_1|}{\alpha_1 + \beta_1} \times 100 \quad (2)$$

The frequency band separation coefficient $\theta_1$ should be at least 30 or above, as described above. Accordingly, the RFIC in the present invention should select frequency bands for a transmission signal and a reception signal that satisfy the following formula as a pair of frequency bands for a transmission signal and a reception signal input to the duplexer.

Formula 3

$$\theta_1 = \frac{2|\alpha_1 - \beta_1|}{\alpha_1 + \beta_1} \times 100 \geq 30 \quad (3)$$

First Embodiment

Figure 10:
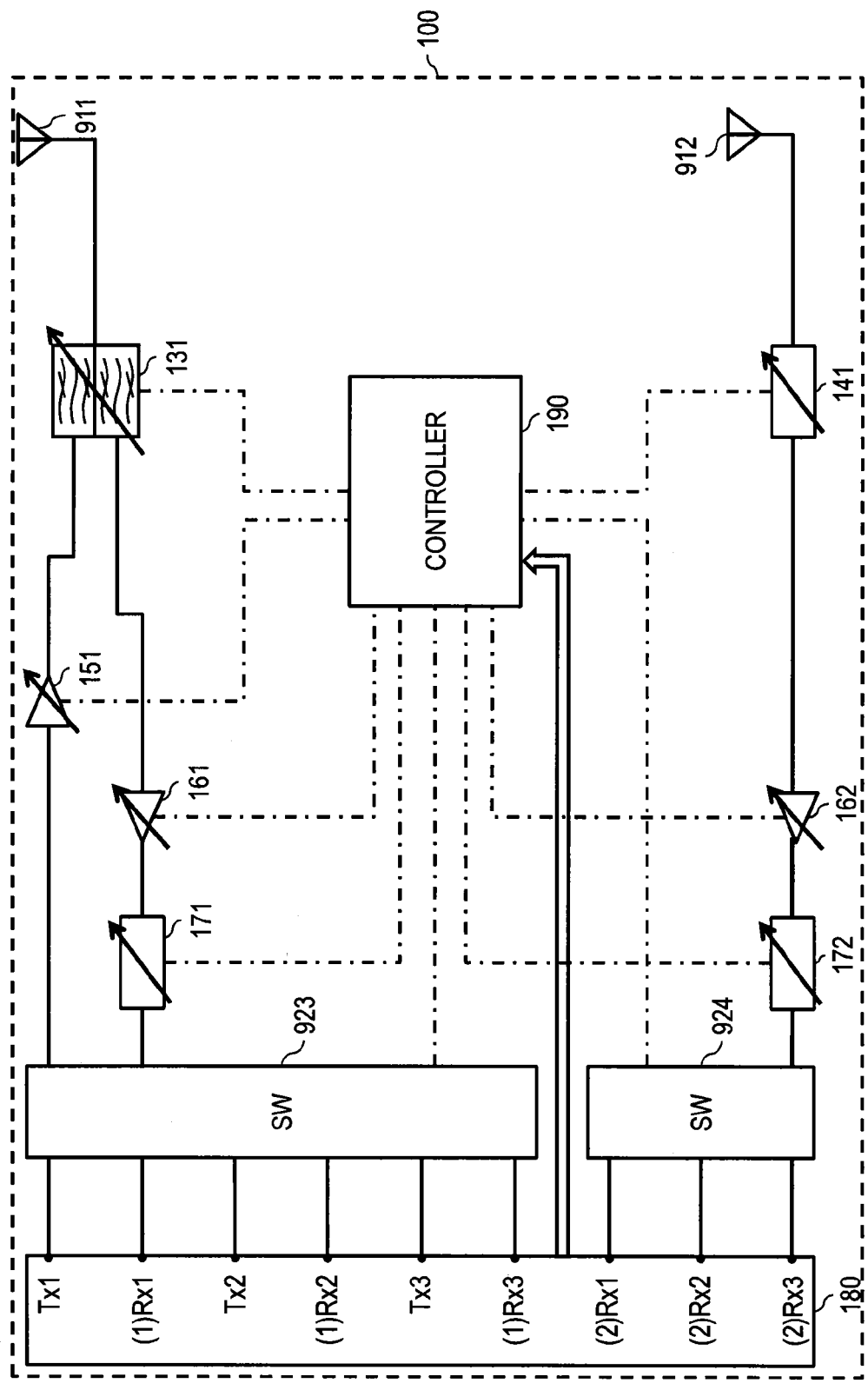
FIG. 10 is a block diagram showing the configuration of a wireless circuit of a first embodiment of the present invention.

On the basis of the description given above, a wireless circuit according to a first embodiment of the present invention will be described with reference to FIG. 10. FIG. 10 is a block diagram showing the configuration of a wireless circuit 100 of the first embodiment. As shown in FIG. 10, the wireless circuit 100 of this embodiment includes a transmission-reception antenna 911, a reception antenna 912, a variable frequency duplexer 131, a variable frequency filter 141, a variable frequency amplifier 151, variable frequency low-noise amplifiers 161 and 162, variable frequency filters 171 and 172, switches 923 and 924, an RFIC 180, and a controller 190.

The common terminal of the variable frequency duplexer 131 is connected to the transmission-reception antenna 911. The input terminal of the variable frequency filter 141 is connected to the reception antenna 912. The output terminal of the variable frequency amplifier 151 is connected to the transmission terminal of the variable frequency duplexer 131. The input terminal of the variable frequency low-noise amplifier 161 is connected to the reception terminal of the variable frequency duplexer 131. The input terminal of the variable frequency low-noise amplifier 162 is connected to the output terminal of the variable frequency filter 141. The input terminal of the variable frequency filter 171 is connected to the output terminal of the variable frequency low-noise amplifier 161. The input terminal of the variable frequency filter 172 is connected to the output terminal of the variable frequency low-noise amplifier 162. The switch 923 is a double-pole six-throw switch, which has two common contacts (one transmission-circuit common contact and one reception-circuit common contact) and six transfer contacts (three transmission-circuit transfer contacts and three reception-circuit transfer contacts). The switch 923 connects the transmission-circuit common contact and one of the three transmission-circuit transfer contacts, leaving the two other transmission-circuit transfer contacts open or grounding them. The switch 923 also connects the reception-circuit common contact and one of the three reception-circuit transfer contacts, leaving the two other transmission-circuit transfer contacts open or grounding them. The transmission-circuit common contact of the switch 923 is connected to the input terminal of the variable frequency amplifier 151. The reception-circuit common contact of the switch 923 is connected to the output terminal of the variable frequency filter 171. The switch 924 is a single-pole three-throw switch, which has one common contact and three transfer contacts. The switch 924 connects the common contact and one of the three transfer contacts, leaving the two other transfer contacts open or grounding them. The common contact of the switch 924 is connected to the output terminal of the variable frequency filter 172. The RFIC 180 includes transmission ports Tx1, Tx2, and Tx3 for first, second, and third frequency bands, first reception ports (1)Rx1, (1)Rx2, and (1)Rx3 for the first, second, and third frequency bands, and second reception ports (2)Rx1, (2)Rx2, and (2)Rx3 for the first, second, and third frequency bands. The ports Tx1, Tx2, and Tx3 of the RFIC 180 are connected respectively to the three transmission-circuit transfer contacts of the switch 923. The ports (1)Rx1, (1)Rx2, and (1)Rx3 of the RFIC 180 are connected respectively to the three reception-circuit transfer contacts of the switch 923. The ports (2)Rx1, (2)Rx2, and (2)Rx3 of the RFIC 180 are connected respectively to the three transfer contacts of the switch 924. The controller 190 is connected to the variable frequency duplexer 131, the variable frequency filter 141, the variable frequency amplifier 151, the variable frequency low-noise amplifiers 161 and 162, the variable frequency filters 171 and 172, and the switches 923 and 924 by control lines (represented by alternate long and short dashed lines in the figure) and can execute frequency switching operations and switching control operations of the switches through the control lines. The controller 190 is also connected to the RFIC 180 by a control signal line (represented by a white arrow in the figure). The controller 190 receives a control signal from the RFIC 180 through the control signal line.

Figure 11:
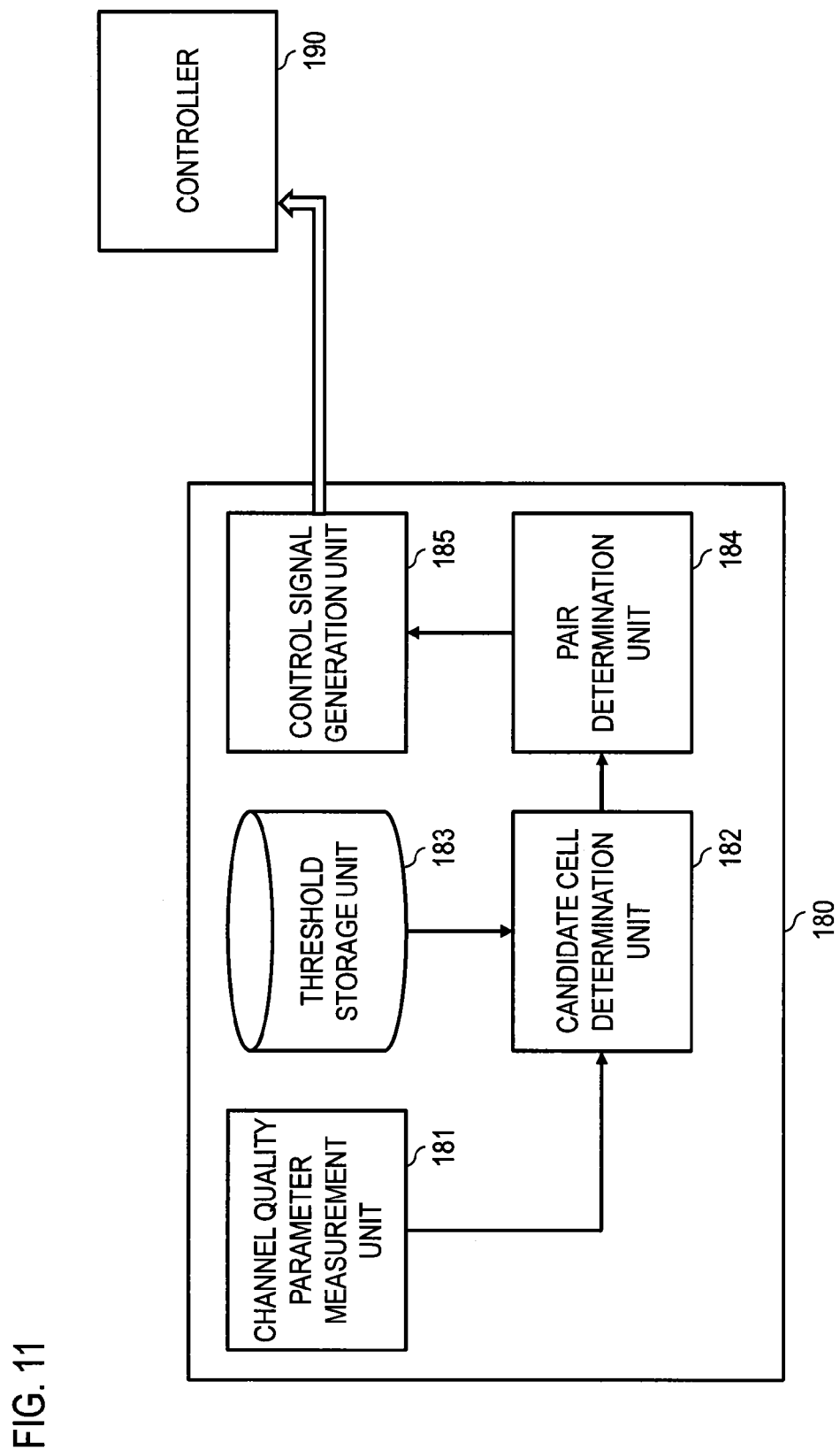
FIG. 11 is a block diagram showing the configuration of a system included in an RFIC in the wireless circuit of the first embodiment.
Figure 12:
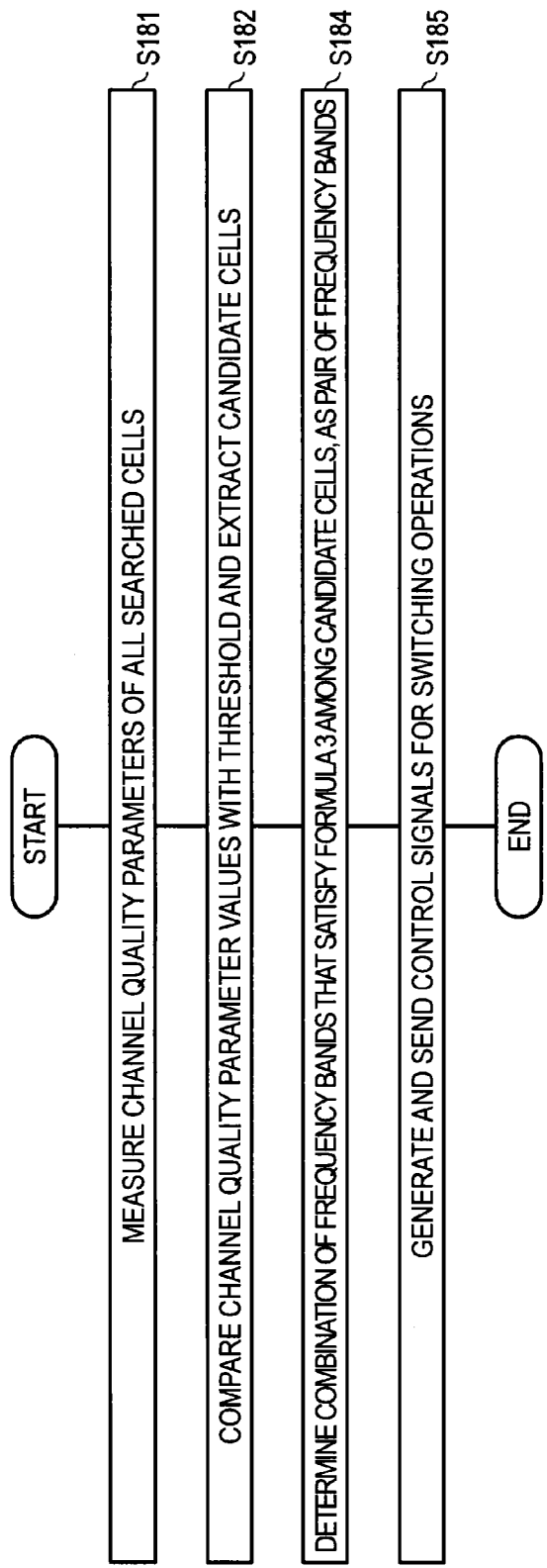
FIG. 12 is a flowchart illustrating the operation of the system included in the RFIC in the wireless circuit of the first embodiment.

Next, the structure and operation of a system in the RFIC 180 will be described in detail with reference to FIGS. 11 and 12. FIG. 11 is a block diagram showing a configuration of the system included in the RFIC 180 of the wireless circuit 100 in this embodiment. FIG. 12 is a flowchart illustrating the operation of the system included in the RFIC 180 of the wireless circuit 100 in this embodiment. The RFIC 180 included in the wireless circuit 100 of this embodiment includes a control system. The control system included in the RFIC 180 has the functions of a channel quality parameter measurement unit 181, a candidate cell determination unit 182, a threshold storage unit 183, a pair determination unit 184, and a control signal generation unit 185, as shown in the block diagram in FIG. 11.

The channel quality parameter measurement unit 181 measures the channel quality parameters of all searched cells (S181). The candidate cell determination unit 182 compares the values of the channel quality parameters measured by the channel quality parameter measurement unit 181 with a threshold stored in the threshold storage unit 183 and extracts cells having channel quality parameter values exceeding the threshold as candidate cells (S182). The pair determination unit 184 determines a combination of frequency bands that satisfy formula 3 given earlier, of a candidate cell among the candidate cells extracted by the candidate cell determination unit 182, as a pair of frequency bands for transmission and reception signals (S184). The control signal generation unit 185 generates control signals to perform switching control operations to connect the transmission port corresponding to the determined transmission-signal frequency band and the transmission terminal of the variable frequency duplexer 131 and to connect the reception port corresponding to the determined reception-signal frequency band and the reception terminal of the variable frequency duplexer 131 and to control the transmission filter of the variable frequency duplexer 131 to have a pass loss of up to 1 dB in the determined transmission frequency band and a pass loss of 40 dB or above in the reception frequency band and to control the reception filter of the variable frequency duplexer 131 to have a pass loss of up to 1 dB in the determined reception frequency band and a pass loss of 40 dB or above in the transmission frequency band, and sends the generated control signals to the controller 190 (S185). On the basis of the control signals generated and sent by the control signal generation unit 185, the controller 190 executes the switching control operations of the switch 923 and the frequency switching operations of the variable frequency duplexer 131, the variable frequency amplifier 151, the variable frequency low-noise amplifier 161, and the variable frequency filter 171.

Figure 13:
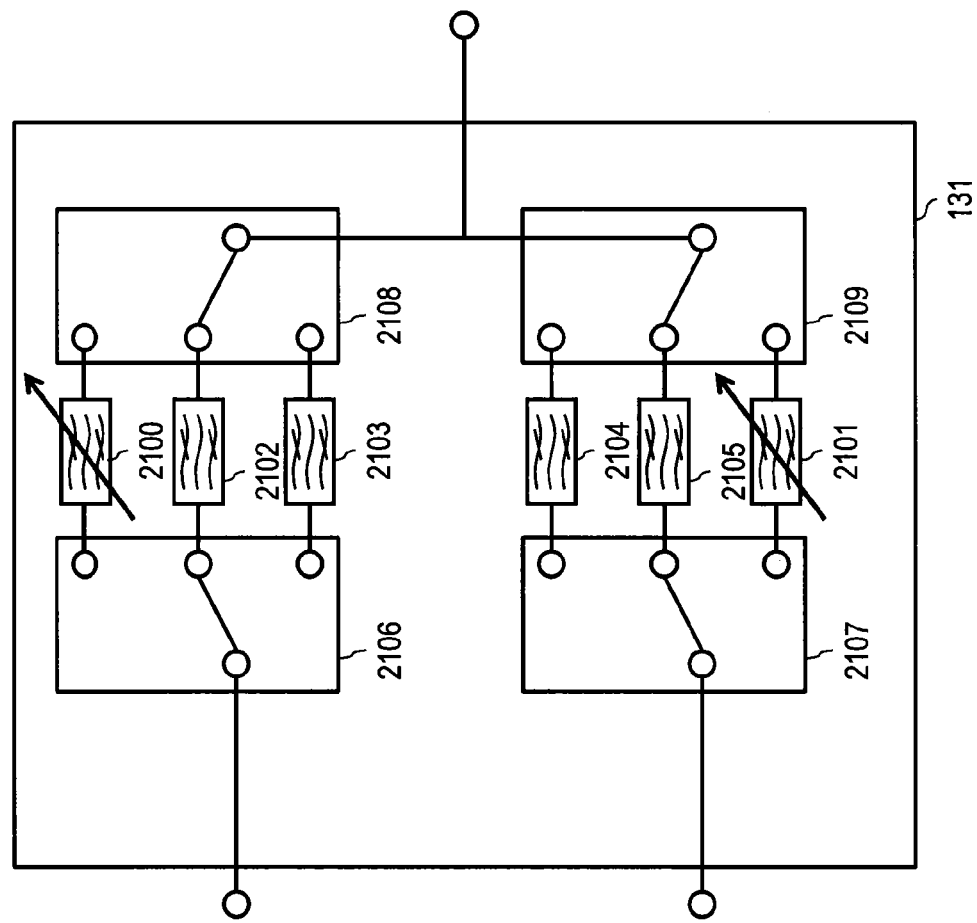
FIG. 13 is a diagram showing an example configuration of a variable frequency duplexer.

If it becomes necessary to temporarily use in transmission and reception a conventional pair of frequencies that are close to each other, as defined in 3GPP, in order to keep compatibility with current systems or in a process of determining frequencies, the RFIC should prevent reception from occurring at transmission timing. This can be implemented in a number of ways, such as tuning the reception stop band of the variable frequency duplexer 131 to the transmission frequency, controlling a variable suppressor switchable between losses of 0 dB and about 40 dB and provided between the variable frequency duplexer 131 and the variable frequency low-noise amplifier 161 to increase suppression in transmission, and turning off the power to the low-noise amplifier 161 in transmission. Alternatively, as shown in FIG. 13, filters 2102, 2103, 2104, and 2105 having steep characteristics, as used in the conventional duplexers, may be provided together with variable frequency filters 2100 and 2101 in the variable frequency duplexer 131, and when it becomes necessary to temporarily use a pair of frequencies that are close to each other, switches (2106, 2107, 2108, 2109) may be controlled to use the filters 2102, 2103, 2104, and 2105. In that case, the scale of the configuration is larger than the variable frequency duplexer formed only of the variable frequency filters 2100 and 2101 but is still smaller than a configuration that includes a duplexer formed of filters having steep characteristics for all necessary frequency bands.

As described earlier, the wireless circuit 100 in this embodiment can be used in the first, second, and third frequency bands. For example, suppose that the candidate cell determination unit 182 extracts cells that cover all of the first, second, and third frequency bands as candidate cells. Suppose also that the pair determination unit 184 determines that the first and third frequency bands are a pair of frequency bands for transmission and reception signals to be input to the variable frequency duplexer 131, in order that the boundary frequency $\alpha_1$ of the first frequency band when the first frequency band is determined as the transmission frequency band, and the boundary frequency $\beta_3$ of the third frequency band when the third frequency band is determined as the reception frequency band satisfy formula 3. Then, the control signal generation unit 185 sends control signals to the controller 190 to connect the transmission-circuit transfer contact connected to Tx1 of the switch 923 with the transmission-circuit common contact, to connect the reception-circuit transfer contact connected to Rx3 with the reception-circuit common contact, to switch the frequency of the variable frequency amplifier 151 to allow amplification of the transmission signal in the first frequency band, to switch the frequency of the variable frequency low-noise amplifier 161 to allow low-noise amplification of the reception signal in the third frequency band, to switch the frequency of the variable frequency filter 171 to set the third frequency band as a pass band, to change the characteristics of the transmission filter of the variable frequency duplexer 131 to set the first frequency band as a pass band and to set the third frequency band as a stop band, and to change the characteristics of the reception filter of the variable frequency duplexer 131 to set the third frequency band as a pass band and to set the first frequency band as a stop band. On the basis of the control signals received from the control signal generation unit 185, the controller 190 executes the switching control operations of the switch 923 and the frequency switching operations of the variable frequency duplexer 131, the variable frequency amplifier 151, the variable frequency low-noise amplifier 161, and the variable frequency filter 171.

If the circuit is used for single-transmission, dual-reception inter-band carrier aggregation and if transmission is performed in the first frequency band, the first and second frequency bands should satisfy the condition expressed by formula 3, and the first and third frequency bands should also satisfy the condition expressed by formula 3. In that case, the antenna 911 can select the second and third frequency bands as the reception frequency bands to be used in carrier aggregation. The control signal generation unit 185 sends control signals to the controller 190 to connect the transmission-circuit transfer contact connected to Tx1 of the switch 923 with the transmission-circuit common contact, to connect the reception-circuit transfer contact connected to Rx2 with the reception-circuit common contact and also the reception-circuit transfer contact connected to Rx3 with the reception-circuit common contact, to switch the frequency of the variable frequency amplifier 151 to allow amplification of the transmission signal in the first frequency band, to switch the frequency of the variable frequency low-noise amplifier 161 to allow low-noise amplification of the reception signals in the second and third frequency bands, to switch the frequency of the variable frequency filter 171 to set the second and third frequency bands as pass bands, to change the characteristics of the transmission filter of the variable frequency duplexer 131 to set the first frequency band as a pass band and to set the second and third frequency bands as stop bands, and to change the characteristics of the reception filter of the variable frequency duplexer 131 to set the second and third frequency bands as pass bands and to set the first frequency band as a stop band. On the basis of the control signals received from the control signal generation unit 185, the controller 190 executes the switching control operations of the switch 923 and the frequency switching operations of the variable frequency duplexer 131, the variable frequency amplifier 151, the variable frequency low-noise amplifier 161, and the variable frequency filter 171. A switch that can connect multiple contacts simultaneously, such as connecting the reception-circuit transfer contact connected to Rx2 with the reception-circuit common contact and connecting the reception-circuit transfer contact connected to Rx3 with the reception-circuit common contact simultaneously, can be formed by configuring a single-pole N-throw switch, as shown in the switch 2001 in FIG. 4, as a combination of single-pole single-throw switches.

As shown in FIG. 10, the wireless circuit 100 in this embodiment includes the reception antenna 912. The reception antenna 912 is not an essential element of the wireless circuit in the present invention but can be used for diversity reception, for MIMO, or for single-transmission dual-reception inter-band carrier aggregation. For any of those purposes, the frequency characteristics of the variable frequency filter 141 should be controlled to match those of the reception filter of the variable frequency duplexer 131, as described above. When the antenna is used for single-transmission dual-reception inter-band carrier aggregation, even if the first frequency band and the third frequency band satisfy the condition of formula 3 and the first frequency band and the second frequency band do not satisfy the condition of formula 3, the second frequency band can be selected as the reception frequency band used in carrier aggregation, for example, in the reception antenna 912 by using isolation characteristics between the antenna 911 and the antenna 912. In that case, the control signal generation unit 185 generates control signals to use the first frequency band for transmission and the third frequency band for reception, to connect the transfer contact connected to Rx2 of the switch 924 with the common contact, and to switch the variable frequency filter 141, the variable frequency low-noise amplifier 162 and the variable frequency filter 172 to optimize them in the second and third frequency bands, and sends the signals to the controller 190. On the basis of the control signals generated and sent by the control signal generation unit 185, the controller 190 executes the switching control operations of the switch 924 and the frequency switching operations of the variable frequency filter 141, the variable frequency low-noise amplifier 162, and the variable frequency filter 172.

The wireless circuit 100 in this embodiment is an example showing that the circuit can be used in three frequency bands, and includes the reception antenna 912 in addition to the transmission-reception antenna 911. The circuit is provided by modifying the conventional wireless circuit that can be used in three frequency bands, shown in FIG. 1, on the basis of the technical concept of the present invention. Although the wireless circuit in this embodiment can be used in three frequency bands, the technical concept of the present invention does not limit the number of frequency bands in which the circuit can be used. Accordingly, this embodiment is just a single example of the circuit that can be used in three frequency bands. The wireless circuit of the present invention can be implemented in the same way for four frequency bands, five frequency bands, and so on. To make it possible to use the circuit in N given frequency bands (N is an integer not smaller than 1), the RFIC 180 should have at least N transmission ports (Tx1, Tx2, . . . , TxN) and N reception ports ((1)Rx1, (1)Rx2, . . . , (1)RxN), and the switch 923 should be a double-pole 2N-throw switch with the 2N transfer contacts connected respectively to the N transmission ports (Tx1, Tx2, . . . , TxN) and the N reception ports ((1)Rx1, (1)Rx2, . . . , (1)RxN). The reception antenna 912 is not essential, as described earlier, but if the reception antenna 912 is included, the switch 924 should be a single-pole N-throw switch, the RFIC 180 should have N second reception ports (2)Rx1, (2)Rx2, . . . , (2)RxN for diversity reception or for MIMO, and these second reception ports should be connected respectively to the N transfer contacts of the switch 924. The connections and the positional relationships of the variable frequency filter 141, the variable frequency amplifier 151, the variable frequency low-noise amplifiers 161 and 162, and the variable frequency filters 171 and 172 are the same as those in the wireless circuit 100.

If the variable frequency low-noise amplifiers 161 and 162 perform sufficient low-noise amplification, loss in the pass band does not matter, and accordingly, variable frequency filters that have a simpler structure than the variable frequency filters included in the variable frequency duplexer, that is, variable frequency filters configured to maximize the amount of suppression in the stop band, can be also used as the variable frequency filters 171 and 172. Depending on the reception performance of the RFIC 180, the variable frequency filters 171 and 172 can also be omitted.

Since the frequency bands of the transmission and reception ports of the RFIC 180 are fixed in this embodiment, switching control operations of the switches 923 and 924 are required. If the transmission and reception ports of the RFIC 180 are used in multiple frequency bands and if the signals input to the ports are switched inside the RFIC, the switches 923 and 924 become unnecessary.

Although the variable frequency amplifier 151 and the variable frequency low-noise amplifiers 161 and 162 are used in this embodiment, some or all of the amplifiers may be replaced with a broadband amplifier and broadband low-noise amplifiers that can perform amplification in the presumed frequency bands. In that case, it becomes unnecessary for the controller 190 to control the variable frequency amplifier 151 and the variable frequency low-noise amplifiers 161 and 162 that are replaced with the broadband amplifier and the broadband low-noise amplifiers.

According to the wireless circuit 100 in this embodiment, since the RFIC 180 determines, in accordance with formula 3, a pair of frequencies that can be input to the variable frequency duplexer 131, the variable frequency duplexer 131 formed using current variable frequency filters that do not have steep pass characteristics can be used in multiple frequency bands.

What is claimed is:

1. A wireless circuit comprising:
   a transmission-reception antenna;
   a variable frequency duplexer having a common terminal connected to the transmission-reception antenna;
   a double-pole 2N-throw switch having two common contacts respectively connected to a transmission terminal and a reception terminal of the variable frequency duplexer, N being an integer not smaller than 1;
   an RFIC which includes N transmission ports and N reception ports respectively connected to 2N transfer contacts of the switch; and
   a controller which is connected to the variable frequency duplexer and the switch through control lines and executes switching control operations of the switch and a frequency switching operation of the variable frequency duplexer in accordance with control signals;
   the RFIC determining a pair of frequency bands for a transmission signal and a reception signal input to the variable frequency duplexer and generating and sending the control signals for performing the switching control operations to connect a transmission port corresponding to the determined transmission-signal frequency band with the transmission terminal of the variable frequency duplexer and to connect a reception port corresponding to the determined reception-signal frequency band with the reception terminal of the variable frequency duplexer and for performing the frequency switching operation of the variable frequency duplexer, wherein
   the RFIC comprises circuitry configured to:
      measure channel quality parameter values of all searched cells;
      compare the measured channel quality parameter values with a predetermined threshold and extract cells having channel quality parameter values exceeding the threshold as candidate cells;
      determine a combination of frequency bands that satisfy a given condition, of a candidate cell among the extracted candidate cells, as the pair of frequency bands for a transmission and a reception signal; and
      generate and send the control signals for performing the switching control operations to connect the transmission port corresponding to the determined transmission-signal frequency band with the transmission terminal of the variable frequency duplexer and to connect the reception port corresponding to the determined reception-signal frequency band with the reception terminal of the variable frequency duplexer and for performing the frequency switching operation of the variable frequency duplexer, and
   the given condition is determined in accordance with a frequency band separation coefficient $\theta_1$ given by:

$$\theta_1 = \frac{2|\alpha_1 - \beta_1|}{\alpha_1 + \beta_1} \times 100 \quad (2)$$

where $\alpha_1$ is a boundary frequency of the transmission frequency band that is closer to the reception frequency band, and $\beta_1$ is a boundary frequency of the reception frequency band that is closer to the transmission frequency band.

2. The wireless circuit according to claim 1, wherein the given condition is that the frequency band separation coefficient $\theta_1$ is not smaller than 30.

3. The wireless circuit according to claim 1, wherein reception is not performed at a transmission timing in the reception frequency band where the frequency band separation coefficient $\theta_1$ falls below 30.

4. A frequency pair determination method for determining a pair of frequency bands for a transmission signal and a reception signal input to a variable frequency duplexer in a wireless circuit provided with:
   a transmission-reception antenna;
   the variable frequency duplexer, having a common terminal connected to the transmission-reception antenna;
   a double-pole 2N-throw switch having two common contacts respectively connected to a transmission terminal and a reception terminal of the variable frequency duplexer, N being an integer not smaller than 1; and
   an RFIC which includes N transmission ports and N reception ports respectively connected to the 2N transfer contacts of the switch;
   the frequency pair determination method comprising:
      a control step of executing switching control operations of the switch and a frequency switching operation of the variable frequency duplexer in accordance with control signals; and
      an RFIC step of determining the pair of frequency bands for a transmission signal and a reception signal input to the variable frequency duplexer and generating and sending the control signals for performing the switching control operations to connect a transmission port corresponding to the determined transmission-signal frequency band with the transmission terminal of the variable frequency duplexer and to connect a reception port corresponding to the determined reception-signal frequency band with the reception terminal of the variable frequency duplexer and for performing the frequency switching operation of the variable frequency duplexer, wherein
   the RFIC step comprises:
      a channel quality parameter measurement substep of measuring channel quality parameter values of all searched cells;
      a candidate cell determination substep of comparing the measured channel quality parameter values with a predetermined threshold and extracting cells having channel quality parameter values exceeding the threshold as candidate cells;
      a pair determination substep of determining a combination of frequency bands that satisfy a given condition, of a candidate cell among the extracted candidate cells, as the pair of frequency bands for a transmission signal and a reception signal; and
      a control signal generation substep of generating and sending the control signals for performing the switching control operations to connect the transmission port corresponding to the determined transmission-signal frequency band with the transmission terminal of the variable frequency duplexer and to connect the reception port corresponding to the determined reception-signal frequency band with the reception terminal of the variable frequency duplexer and for performing the frequency switching operation of the variable frequency duplexer, and
   the given condition is determined in accordance with a frequency band separation coefficient $\theta_1$ given by:

$$\theta_1 = \frac{2|\alpha_1 - \beta_1|}{\alpha_1 + \beta_1} \times 100 \qquad (2)$$

where $\alpha_1$ is a boundary frequency of the transmission frequency band that is closer to the reception frequency band, and $\beta_1$ is a boundary frequency of the reception frequency band that is closer to the transmission frequency band.

5. The frequency pair determination method according to claim 4, wherein the given condition is that the frequency band separation coefficient $\theta_1$ is not smaller than 30.

6. The frequency pair determination method according to claim 4, wherein reception is not performed at a transmission timing in the reception frequency band where the frequency band separation coefficient $\theta_1$ falls below 30.

* * * * *